United States Patent
Hossack

(10) Patent No.: US 9,565,153 B2
(45) Date of Patent: *Feb. 7, 2017

(54) PAUSING OF CONTENT DELIVERY IN PUSH NOTIFICATIONS

(71) Applicant: Electronic Arts Inc., Redwood City, CA (US)

(72) Inventor: Paul Hossack, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/074,572

(22) Filed: Nov. 7, 2013

(65) Prior Publication Data

US 2014/0214983 A1    Jul. 31, 2014

Related U.S. Application Data

(63) Continuation of application No. 13/794,463, filed on Mar. 11, 2013, now Pat. No. 8,612,534.

(60) Provisional application No. 61/759,330, filed on Jan. 31, 2013.

(51) Int. Cl.
G06F 15/16 (2006.01)
H04L 12/58 (2006.01)
H04L 29/06 (2006.01)
H04L 29/08 (2006.01)

(52) U.S. Cl.
CPC ............... *H04L 51/24* (2013.01); *H04L 51/04* (2013.01); *H04L 65/4015* (2013.01); *H04L 67/14* (2013.01); *H04L 67/26* (2013.01)

(58) Field of Classification Search
CPC ..................... H04N 21/44218; H04N 21/4667; H04N 21/488; H04N 21/482; H04N 21/8133; G06F 3/0481; H04H 60/73; H04W 4/14
See application file for complete search history.

(56) References Cited

U.S. PATENT DOCUMENTS

| 2011/0244955 | A1 | 10/2011 | Dinka et al. |
| 2012/0036423 | A1* | 2/2012 | Haynes, II ............ G06F 17/241 715/230 |
| 2012/0076067 | A1 | 3/2012 | Yao et al. |
| 2012/0311045 | A1 | 12/2012 | Slyvain |

OTHER PUBLICATIONS

Patterson, B. (Jul. 31, 2012). "Mac Tip: How to Pause All your Notification Center Alerts," download from http://heresthethingblog.com/2012/07/31/mac-tip-pause-notification-center/. 7 pages.
(Feb. 16, 2011). "iPhone Appidemic: NHL GameCenter 2010" download from http://www.technologytell.com/apple/68201/iphone-appidemic-nhl-gamecenter-2010/. 4 pages.

* cited by examiner

*Primary Examiner* — Ryan Jakovac
(74) *Attorney, Agent, or Firm* — Lowenstein Sandler LLP

(57) ABSTRACT

A delivery of a message of a notification to a user account may be paused, by the processing device without intervention by a user of the user account, when a first action related to a media event has occurred.

13 Claims, 6 Drawing Sheets

PAUSING OF CONTENT DELIVERY IN PUSH NOTIFICATIONS

RELATED APPLICATIONS

This application is a continuation of U.S. patent application Ser. No. 13/794,463, filed on Mar. 11, 2013, which claims the benefit of U.S. Provisional Patent Application No. 61/759,330, filed on Jan. 31, 2013, which are hereby incorporated by reference in their entirety.

TECHNICAL FIELD

This disclosure relates to the field of push notifications and, in particular, to controlling the delivery of messages of push notifications.

BACKGROUND

Users often employ various computing devices (e.g., computer systems, laptop computers, tablet computers, netbook computers, desktop computers, server computers, personal digital assistants (PDAs), cell phones, smart phones, gaming systems, etc.) to consume (e.g., view, watch, listen, hear, or read) media items, such as broadcast sporting events and to interact with other users in relation to the media item using applications (either third party or developed by the computing device manufacturer) installed on the computing device. The application may be a sports related application in which users can obtain information about sports events and communicate with other users of the application about the sports events.

Such applications may provide for push notifications that forward information about the sporting event from a server supporting the application ("application server") to the computing device. Push notifications may include, for example, messages that a sporting event has started or provide live, real-time, information about a sports match such as changes in the score of a sports match while the sports match is in progress. Receiving score information may be undesirable at times, for example, when a person has recorded a broadcast of the sports match and wants to watch the sports match at a later time without knowing details about the sports match.

Conventional applications with notification features require the user to manually turn off notifications within an application at times when they do not want to receive notifications and then go back into an application to turn these notifications back on. Rather, than going into each application to turn off notifications, some computing device operating systems allow users to completely turn off notification functionality by going into the operating system notification settings and selectively turning off banners and alerts for all of the notification supported applications. Eventually, a user would still have to go back into the operating system notifications settings and turn back on notifications for each of the applications. Whether through the operating system settings or individual application settings, having to go back and turn on notifications can be a tedious process. Some operating systems allow a user to put all notifications on pause or disable them until the user goes back into the operating system notification settings and re-enables the notification capability or sets a time period for which the notifications will be disabled and then turned back on. However, such notification disablement features are applied generally to all applications running on the computing device.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
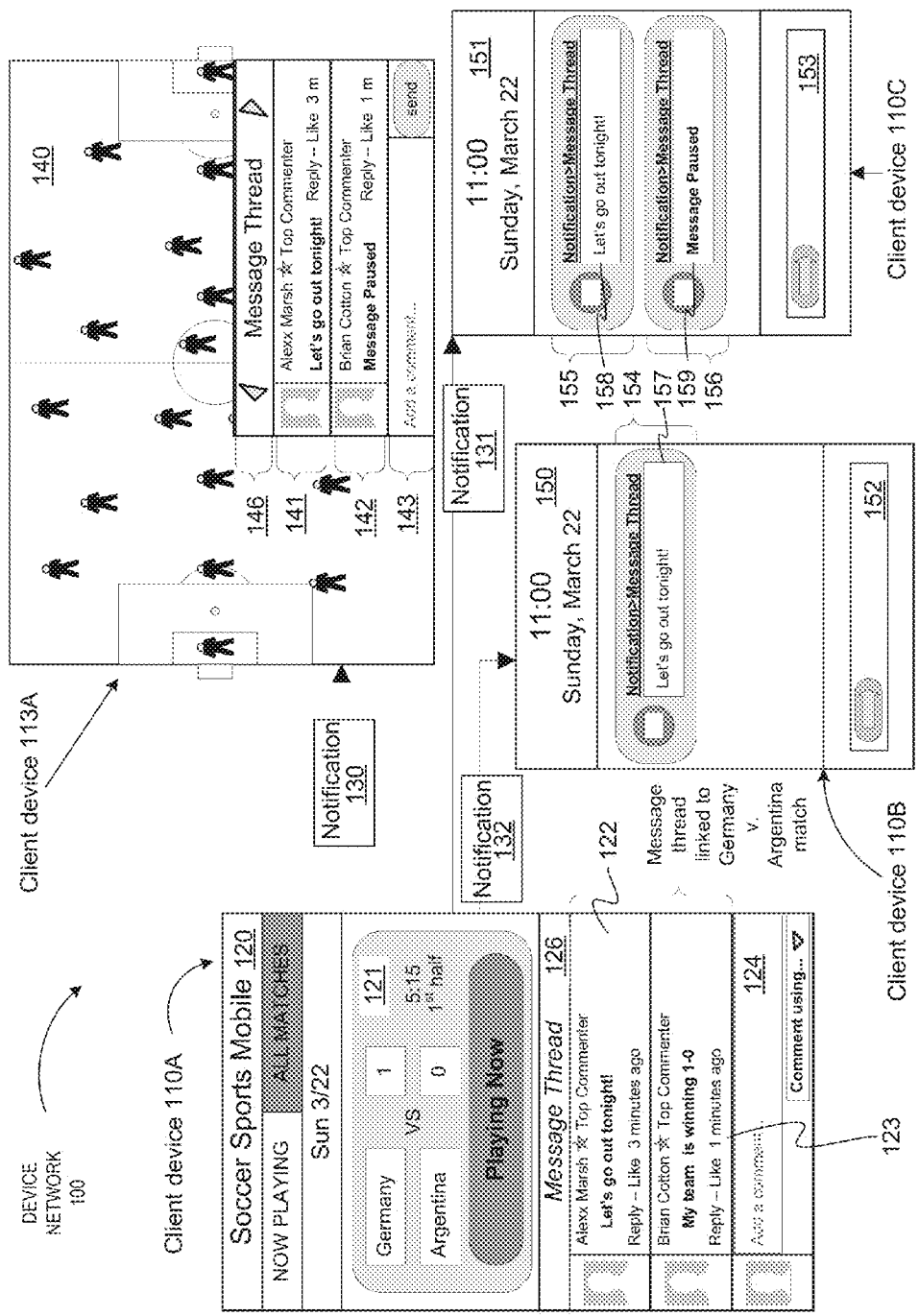
FIG. 1 is a block diagram of computer devices in a network, in accordance with one embodiment.

Systems and methods in accordance with various embodiments of the present disclosure provide the ability for a user to control the delivery of notifications to a computing device relating to a particular event. For example, an application relating to sporting events may provide users the ability to receive information relating to particular sporting events and also communicate with other users about particular sporting events. The application may be configured to send push notifications to the user, from the application server, about the scoring in the sporting event as it occurs and/or to send notifications of messages from other users of the application relating to the scoring in the sporting event. However, if the user has recorded a broadcast of the sporting event for viewing after the live sporting event has started, the user may not want to receive information about the content of the push notifications (i.e., the message) relating to the sporting event since the content of the message may include spoiler information that would interfere with the user's enjoyment of watching the recorded broadcast of the sporting event.

Embodiments of the present disclosure provide for methods and systems for enabling a user to control the delivery of message notifications, from an application's supporting server (i.e., application server) to a user's account or computing device having the application installed thereon. An application is any software (e.g., program, module, service, daemon, script, etc.) that provides media event information for any type of computing platform (e.g., mobile, desktop, gaming, television, cloud, etc.) such as mobile device applications, RSS reader, operating system, etc. A notification message includes any type of message such as a text message, multi media message (e.g., picture, video, audio), uniform resource locator (URL), etc. For some examples, the notification may be in the form of a smart phone push notification (e.g., including text, image and/or audio), a banner, feedback from a voice assistant, a pop-up overlay in a console video game or a mobile phone video game.

As an illustrative example of one embodiment, a user may have recorded the broadcast of an International football (also known in the United States as soccer and hereinafter referred to as "soccer" for ease of discussion) match and started viewing the match sometime after the match has begun. The user of a sports application that provides information related to the match might not want to learn information (e.g., goals scored) about the match before the user has done so through watching the recorded broadcast itself. The user's friends, however, may be watching the live broadcast of the match and send messages to the user through the application such as "My team is winning 1-0" or the application server may be monitoring the progress of the match and automatically sending a push notification of the score changes to the user via user configured alerts. The content of such messages may be referred to as spoiler information because is reveals information regarding the media (e.g., score of the sporting match) in a manner that spoils the user's enjoyment of the revelation of the information over the time and manner in which the user desires to learn of the information. Although the user may not actively be using the application, the application may be set (e.g., via alerts configurable by the user through the user interface of the application) to send push notifications, upon scoring in the match, containing a message with scoring information (e.g., from the application's server or message from another user of the application), may be displayed on the lock screen of the computing device, and undesirably seen by the user when the user picks up the computing device to receive a call or perform some function unrelated to the application or sporting event. If the user has not yet become aware of the content of the notification message through watching the recorded broadcast itself, then the reading of such a notification message might spoil the user's continued watching of the recorded broadcast of the match.

FIG. 1 is a block diagram of computer devices in a network, in accordance with one embodiment of the present disclosure. In the exemplary embodiment shown in FIG. 1, application 120 is a soccer sports mobile application that provides for message threads 126 among users that are specifically related to an event, in this case a soccer match between Germany and Argentina (121). Message threading is a feature of an application 120 that groups together messages, for example messages 122 and 123, relating to a common topic such as a discussion about an event (e.g., 121). Users may post a message (e.g., messages 122 and 123) to a thread 126 associated with event (e.g., 121) after the start of the event (e.g., 123 "My team is winning 1-0"). The application 120, 140, 150, or 151 (or software on an application server supporting application 120, 140, 150, or 151 on client device 110A, 113A, 110B, and 110C, respectively) may provide the user with a predetermined list of certain events that users can post messages for and also for the user to select among for pausing delivery of any message notifications related to the selected event. In this manner, the user configures the application 120, 140, 150, and 151 on their computing devices (110A, 113A, 110B, 110C, respectively) to pause the delivery of any notifications (e.g., 130, 131, 132) (or the message content of a notification) from other users relating to the event (e.g., 121).

It should be noted that for ease of discussion, the present disclosure may refer to client device applications 120, 140, 150, and 151. However, an application can also be on the server (e.g., application server) or distributed among devices in alternative embodiments.

In the embodiment shown in FIG. 1, client device 110A displays the real-time score of the soccer match between Germany and Argentina 121. Additionally, client device 110A displays message thread 126. Message thread 126 is linked to the soccer match between Germany and Argentina and displays user-generated messages 122 and 123. Additionally, message thread 126 provides comment box 124 in which a user can post a comment to message thread 126.

Client devices 113A, 110B, and 110C, also known as recipient devices, have been configured to receive notifications of messages posted to message thread 126. However, the recipient devices 113A, 110B, and 110C have also been configured to pause the delivery of notification messages (or notifications) relating to the soccer match between Germany and Argentina beginning at the start of the match. For example client devices 110C, 110B, 110C, 113A, illustrated in the embodiment in FIG. 1, are communicatively coupled to each other (e.g., coupled to each other via a network). Message 123, "My team is winning 1-0" has been posted in message thread 126 on client device 110A. The content of message 123 relate to the match between Germany and Argentina. Once the message has been posted, client device 110A sends out a notification 130, 131 and 132 of the posting. Notification 130, 131, and 132 can be sent directly to the recipient devices 113A, 110C, and 110B respectively or to a server device before being sent to the recipient devices 130, 131, and 132. Recipient devices 110B, 110C, and 113A have been configured to pause notification messages related the Germany versus Argentina match beginning at the start of the match. Consequently, recipient devices 110B, 110C, and 113A have been configured to pause the delivery of message 123.

For the embodiment illustrated in FIG. 1, client device 113A has removed the contents of message 123 but has displayed the transmitting identity of notification 130, as illustrated in message 142. Client device 113A displays identity information such as sender (i.e., Brian Cotton), and time posted (i.e., one minute prior). Likewise, client device 110C has removed the contents of message 123 but has displayed the transmitting identity of notification 131, as illustrated in message 159. Alternatively, client device 110B has completely blocked any display of the receipt of notification 132. It should be noted, that the notification can be blocked at the client device 113A, 110C, 110B or at a server device.

In the embodiment illustrated in FIG. 1, recipient devices 110B, 110C, and 113A, have received messages 157, 158, and 141, respectively, linked to the soccer match 121, via message thread 126, even though the recipient devices 110B, 110C, and 113A have been configured to pause message notifications related to the match 121 and posted after the start of the match 121. It can be observed that each recipient device 110B, 110C, and 113A has received message 122, "Let's go out tonight,"—message 157, 158, and 141 demonstrate the received message. Recipient devices 110B, 110C, and 113A receive message 122 because the message 122 does not contain information related to the soccer match. In contrast, the delivery of message 123, "My team is winning 1-0," has been paused on all recipient devices 110B, 110C, and 113A because it reveals spoiler information about the soccer match 121.

In one embodiment, a user's account or accounts are configured to pause message delivery. A user account may be linked to multiple applications (e.g., 120, 140, and 151) and multiple devices (e.g., 110A, 110B, and 113A). Consequently, by configuring a single user account to pause message notifications, multiple devices (e.g., 110A, 110B, and 113A) and applications (e.g. 140 and 151) may be controlled. For example, client device 113A and 110C can be linked by a single user account. Client device 113 is a gaming console running an interactive soccer game application 140. Client device 110C is a mobile phone device running mobile application 151. The user, by configuring a single user account, can pause the delivery of message notifications (e.g., 130 and 131) related to the Germany versus Argentina match 121 on, for example, a single application (e.g., 140), on multiple applications (e.g., 140 and 151), on a single device (e.g., 113A), or on multiple devices (e.g., 113A, 110C).

In one embodiment, the message notifications to different user accounts of the same user may be controlled. For example, a user may have an application 151 with a first user account on a first computing device 110C (e.g., a smart phone) that is configured to provide push notifications about an event (e.g. event 121). Further, the user may also have another user account on a different computing device 113A (e.g., a gaming console). In addition to pausing the push notifications sent to the application 151 on the user's first computing device 110C (e.g., a first user account) relating to an event 121, the user may also want to pause any messages that could be sent to another of their user accounts associated with another computing device 113A. For example, the user may have a different account associated with on-line gaming using a gaming console (e.g., client device 131). The user may not want to receive, from other users, any spoiler information related to the event 121 while they are playing an on-line game (unrelated to the event). The user may decide not to watch a soccer match live during its broadcast but, rather, choose to finish playing an on-line soccer game during the first part of the live soccer match. In addition to the user configuring, for example, a soccer application (e.g., 151) on their mobile phone 110C to pause the delivery to the smart phone of messages notifications 159 related to the match event 121, the user may also want to pause or block the delivery of messages with spoiler content that are sent to their game console 113A. In one embodiment, the applications 140, 150, 151 are configured to request the user to provide user account information for the different user accounts for which the user wants to pause delivery of notifications or notification messages related to an event. In one embodiment, the same user account may be used by both applications (e.g., 140 and 151) on the different computing device platforms (e.g., 113A and 110C). For example, a user may be able to log into an application 151 on their client device 110C (e.g., mobile device) platform using the same account information (user name and password) as a gaming application 140 on a gaming device 113A platform. In another embodiment, an application programming interface (API) may be used to interface the software on the different computing devices and/or different computing device platforms for which the user has user accounts to communicate with each other.

In one embodiment the pausing of the notification is based on an event. In the embodiment illustrated in FIG. 1, the pausing of notifications 130, 131, 132 is based upon the start of the event 121, e.g., kick-off of the Germany versus Argentina soccer match. In an alternative embodiment, the trigger for pausing the delivery of notification messages (e.g., messages 142 and 159) is based on actions other than the start of an event 121, such as, the start of an intermediate period within an event 121. For example, a user may start watching a sporting event (e.g., 121) live as it is being broadcasted but then cannot continue watching the second half of the sporting event (e.g., 121) live but, rather, records the broadcast for later viewing. In such an example, the action triggering the pausing of the notification (e.g., 130, 131, and 132) delivery may be the start of the second half of the sporting event (e.g. 121). In one embodiment, other trigger actions may be used, for example, a user pausing the viewing through an application (e.g., 151) on a mobile device (e.g., 110C) or computer, or through a set-top box of a television) of a broadcast of an event (e.g., 121). The pausing of the viewing of the event (e.g., 121) (whether a live broadcast or playback of a recording), can be sent as a signal to the application (e.g., 151) or application server and used as a trigger for pausing the delivery of notifications related to the event (e.g., 121). For example, if a user pauses the viewing of a soccer match at 34 minutes in the first half, the system would then pause any notification delivery (or just block/remove the message content of the notification) at that time. When the user resumes viewing the broadcast of the event (e.g., by pushing a play button), such action may be used as a trigger for the paused notifications to be resumed but, in one embodiment, only those notifications that were received by the application server or application before the current place that the user is viewing the match. The trigger action could be performed through other actions outside of the application (e.g., 151) environment, such as sending a text, providing a command to a mobile device voice assistant, etc.

In one embodiment, application 120, 140, 150, or 151 may not provide a list of sources from which the delivery of message notifications is paused (e.g., messages originating from message thread 126) but, rather, application 120, 140, 150, or 151, or application server may utilize an artificial intelligence (AI) search algorithm to identify key words within notifications messages (e.g., 122 and 123) to be sent to a user to determine whether to pause such notifications. For example, for a soccer match in which Germany and Argentina are currently playing and for which the user does want to receive spoiler information, the application 120, 140, 150, or 151 or application server may search for key words in any notification messages 122 and 123. For example, the AI search algorithm could search for words such as "Germany," "Argentina," "scored," "winning," "team," "beating," etc. that might potentially be related to the soccer match event 121 for which the user wants to pause any notifications containing spoiler information. Subsequently, delivery of the notification would be paused. In one embodiment, the user can receive a prompt that a notification has been detected with messages containing content potentially related to the soccer match, thus offering the user an option to receive the notification. In another embodiment, the AI search algorithm may be utilized in combination with user selected events in which to associate messages. In yet another embodiment, the application server looks at historical data stored for the user relating to previously viewed events (e.g., a soccer match from last week) and based on such information, sends additional information to a user about upcoming events (e.g., a soccer match to be broadcast tomorrow). In such a case, the user may be prompted to indicate whether the user wants notifications paused that might be related to the upcoming event. In an alternative embodiment, the user may be prompted to pause multiple upcoming events (e.g., all Liverpool soccer matches), as a safety net against receiving spoiler information in related threads and get prompted to unpause the delivery of notifications before seeing any messages.

In one embodiment, information other than the message of the notification (i.e., identity of the transmitting user and time of message notification) may be sent to a user, while the delivery of just the message of the notification is paused. In the embodiment illustrated in FIG. 1, the application 120 may deliver a notification 142 (e.g., displayed on the lock screen of the user's computing device) that a particular user (i.e., the particular user's account id) has sent a message and the time the message was sent but not the content of the message (e.g., "My team is winning 1-0"). In one embodiment, an alert that a message has been received can be displayed. In one embodiment, in addition to removing the contents of the message, a notice that "someone has commented" can be displayed rather than indicating the identity of the sender of the message. In this manner, the user will know there are messages waiting for them with content related to a particular event but not see the content of the message until the delivery of the message is unpaused or resumed.

In an alternative embodiment, text messages related to an event may be paused. In one embodiment, news alerts related to an event may be paused. In another embodiment, notifications, banners, alerts, and text chats related to an event may be paused. It should be noted that any form of communication related to an event may be paused.

In an alternative embodiment, for example, voice chat related to a media event may be paused. For example, gamers may voice chart in real-time while playing in a multi-player networked game. Additionally, users of text chat applications often choose to chat by voice rather than text. For example, in the embodiment illustrated in FIG. 1, client device 113A may be connected to other users via voice chat. When another user describes an event related to the Germany versus Argentina soccer match 121, the contents of that message can be paused from the conversation.

The delivery of the message may be set by the user to be resumed in various manners. In one embodiment, the user may define a second event, like a time or event, after which the delivery of notifications can resume. In one embodiment, the delivery of paused notifications or notification messages may resume in response to an occurrence of a second action related to the event without prompting the user, for example, where the application (e.g., 120) or application server detects the posting of a message by the user in the event message thread (e.g., 126) relating to the event (e.g. 121). In one embodiment, a user may be prompted by the application (e.g., 140 and 151) or the application server with a request whether to resume delivery of the content of the message (e.g., 142 and 159). The prompt may be initiated at certain time intervals related to the event (e.g., end of the sporting event, 24 hours after the start of the sporting event), certain time intervals unrelated to the event (e.g., twice a day), or may be based upon the application (e.g., 140 and 151) or application server receiving information from the user relating to the event (e.g. 121). For example, the user may finish viewing the recorded broadcast of the event and post a message related to the event through the application (e.g., 120) or application server. The application (e.g., 120) or application server can detect the posting of a message by the user in the event message thread (e.g., 126) and then, in one embodiment, prompt the user with a query whether to resume the delivery of the message or entire notifications, as the embodiment may be, that was paused. In another embodiment, a user may be prompted whether to resume the delivery of messages when they open a paused message notification.

Figure 2:
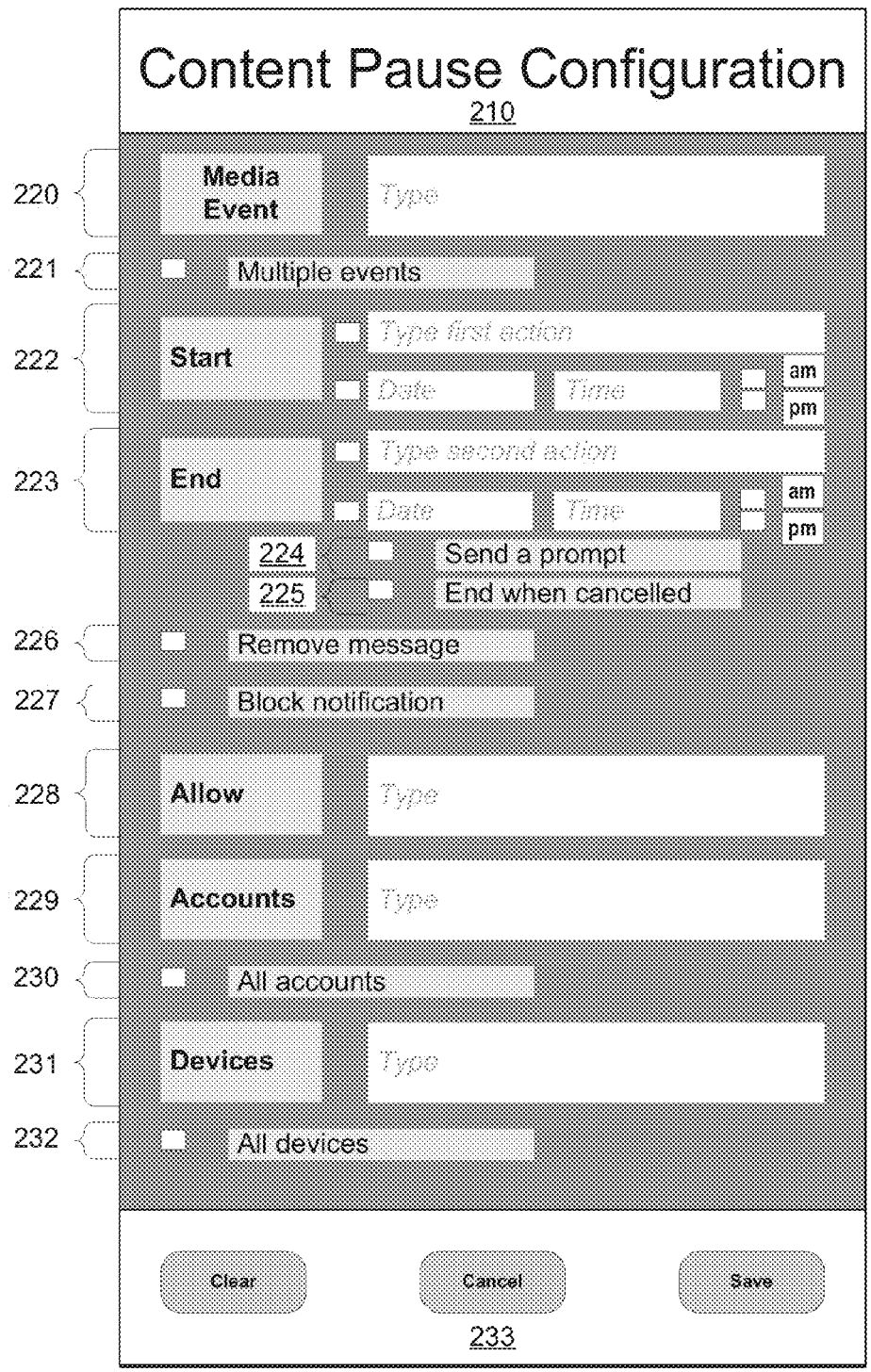
FIG. 2 is a diagram illustrating a configuration graphical user interface (GUI), according to one embodiment.

FIG. 2 is a diagram illustrating a graphical user interface (GUI) used to configure the pause in notifications, according to one embodiment. Configuration GUI 210 contains options that a user, or server, may select to control the delivery of message notifications. In media event 220, the user may input a specific media event for which the user can request a pause in notifications. In the example embodiment illustrated in FIG. 1, the media event is the soccer match between Germany and Argentina. However, the media event need not be limited to soccer or sports event, but could be any number of events including movies, artistic events, or political events. Feature 221 allows the user to select multiple media events for which the user may request a pause in notification. Start 222 allows a user to select a start event or time at which the pause of notification begins. In one embodiment, the user can select a start event by describing a first action, like the kick-off of a soccer match, or a by entering a date and time. End 223 allows a user to end the pause of notification by either the occurrence of a second action or after a specified date and time. In ending the pause of notification, the user has additional options. For example, if feature 224, "send a prompt" is selected, a user will receive a prompt after the end of the period for which the user has selected a pause of notification. This prompt will notify the user that the period of pause notification has ended and ask the user whether they would like to continue pausing or end the pause of notification. Feature 225, "end when cancelled", allows the user not to specify an end of pause notification but instead, allows the user to simply cancel the pause when desired.

In the embodiment illustrated in FIG. 2, GUI 210 contains additional features that allow the user to control the appearance and content of paused notifications. Feature 226 allows a user to remove the message contents of the notification but still receive notice that the user has received a message, alert, notification, etc. For example in the embodiment illustrated in FIG. 1, client device 113A and 110C both receive notification 130 and 131, respectively. However, the content of the message has been removed and replaced with "Message Paused" (message 142 and 153). Nonetheless, information contained in the transmitting identity is displayed. Feature 227 allows the user to block the notification entirely. For example in the embodiment illustrated in FIG. 1, client device 110B displays no indication of the receipt of notification 132. In such an instance, a user will not receive the notification until after the pause notification period has expired or the user chooses to stop the pause of notifications. Allow 228 allows content related to media event 220 to be received despite being paused. For example in the embodiment illustrated in FIG. 1, recipient client devices 113A, 110B, and 110C all received the message 122, "Let's go out tonight" in message thread 126 even though the message thread is related to the Germany versus Argentina soccer match and posted after the start of the event. Such a feature allows for messages containing non-spoiler information to be visible, while messages containing spoiler information to be paused, even though the messages originate from the same media event.

In the embodiment illustrated in FIG. 2, GUI 210 contains additional features that allow the user to select different accounts and devices to apply a notification pause. Accounts feature 229 allows the user to apply a notification pause to a single or multiple user accounts. Devices feature 231 allows the user to apply a notification pause to a single or multiple devices; while feature 232, "all devices," allows a user to apply a notification pause to all devices associated with the selected user accounts. A single user account may be linked to more than one device. In the embodiment illustrated in FIG. 1, recipient client devices 113A and 110B run different applications (i.e., 140 and 150, respectively) but could be linked to a single user account. Continuing the illustration, a user can select to pause notification by listing his or her user account in Accounts 229 and selecting feature 232, "all devices." Alternatively, if the user has more than the two client devices (113A and 110B) associated with a user account, the user can elect to pause notification on client devices 113A and 110B but receive all notification on device Z, for example. In order to invoke such a scenario in the current embodiment, the user can enter his or her account information in Accounts 229 and enter the applicable devices in Devices 231—in this example, client device 113A and 110C.

Figure 3:
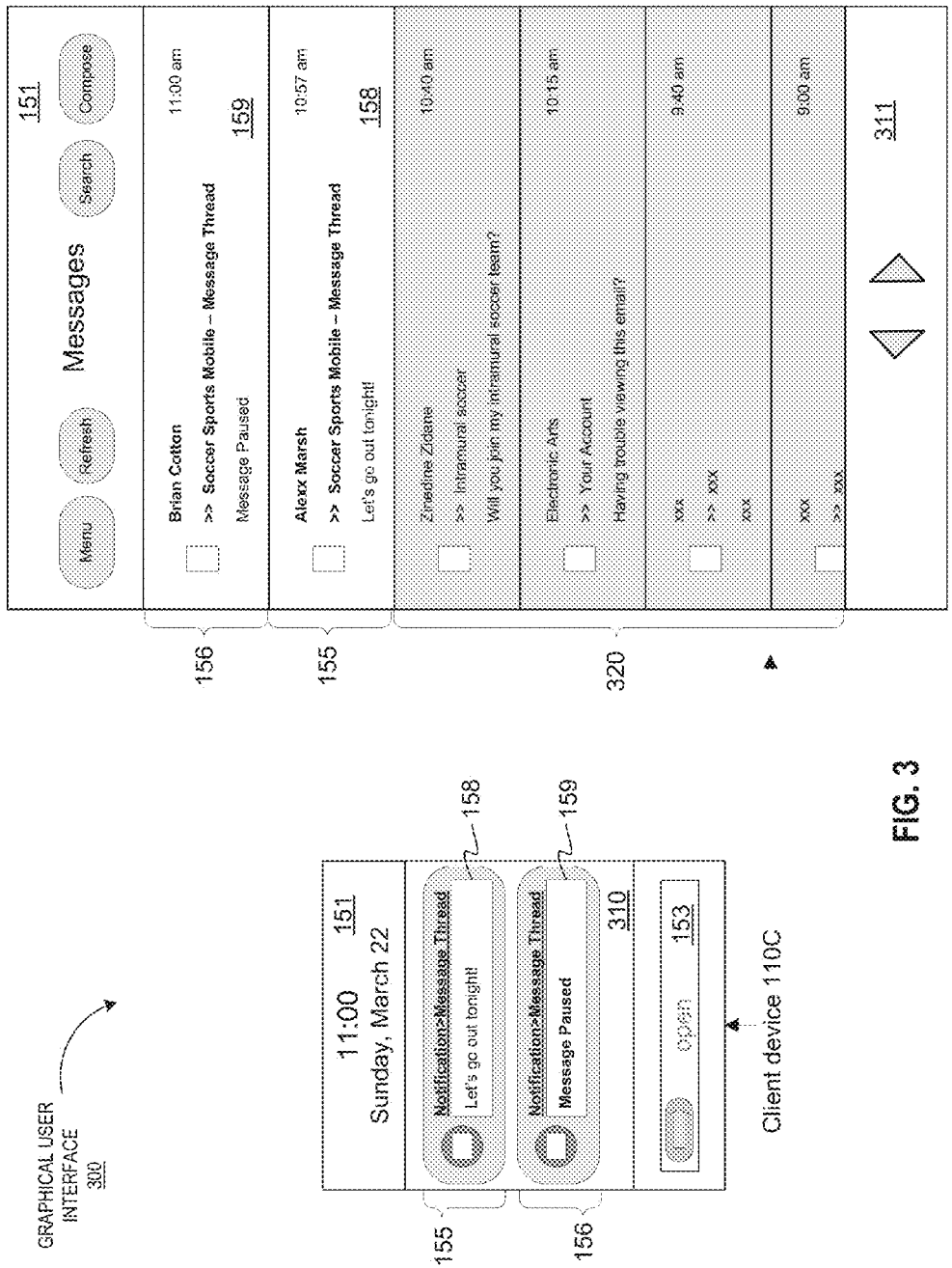
FIG. 3 is diagram illustrating a graphical user interface (GUI), according to one embodiment.

FIG. 3 is a diagram illustrating a graphical user interface (GUI), according to one embodiment. Client device 110C has received message notifications 155 and 156. In one embodiment, GUI 310 is one of several GUIs for application 151. In the embodiment illustrated in FIG. 3, the GUI changes from GUI 310 to GUI 311 when the user unlocks the phone by sliding the slide-to-unlock arrow 153. GUI 311 displays inbox messages containing a collection of messages 155, 156, and 320. Messages 155 and 156 originate from soccer sports mobile application's 120 message thread 126. Messages 320 originate from various sources and do not necessarily originate from message thread 126. In one embodiment, the user can click on message 156 and read the contents of the message even though the message is displayed in GUI 311 as "Message Paused." Such a feature allows the user to pick and choose which paused messages the user reads. In another embodiment, selecting paused message 156 triggers a second action ending the notification pause. In still another embodiment, selecting paused message 156 will be followed by a prompt asking the user whether to end the message notification pause. In another embodiment, the user may read messages that are not paused (e.g. 155 and 320) without influencing the pause notification configuration.

It should be noted, however, that although the present disclosure may be discussed at times in relation to a sporting event for ease of explanation, the present disclosure is not limited to sporting events and scores. In alternative embodiments, the event may be other types of media events that can be consumed (e.g., view, watch, listen, hear, or read) by a user such as music concerts, award shows (e.g., Oscars), movies, news feeds and broadcasts, political debates, televisions programs, etc. For example, the application may be related to movies that allow users to message each other about the release of a new movie. Some users might not see the same show time of a movie. For example, one user may see a showing of a movie that ends at 2 PM while another user may see a showing of the same movie that ends at 7:30 PM. Accordingly, a user may want to set their application to pause message notifications to their user account or computing device based on the ending time of the particular movie showing that they intend to view. In alternative embodiments, the events need not be live, real-time events.

The methods and systems described herein may also be used with alerts. While at times the term "alert" may be inappropriately used as a synonym for "notification" within the art, an alert more precisely is a condition that is set by a user within an application that results in a notification being sent upon the occurrence of the condition. Notifications that are received due to the setting of an alert may be considered a controlled notification, while those not received due to the control of the recipient user (e.g., another user sending a text message) may be considered an uncontrolled notification.

Figure 4:
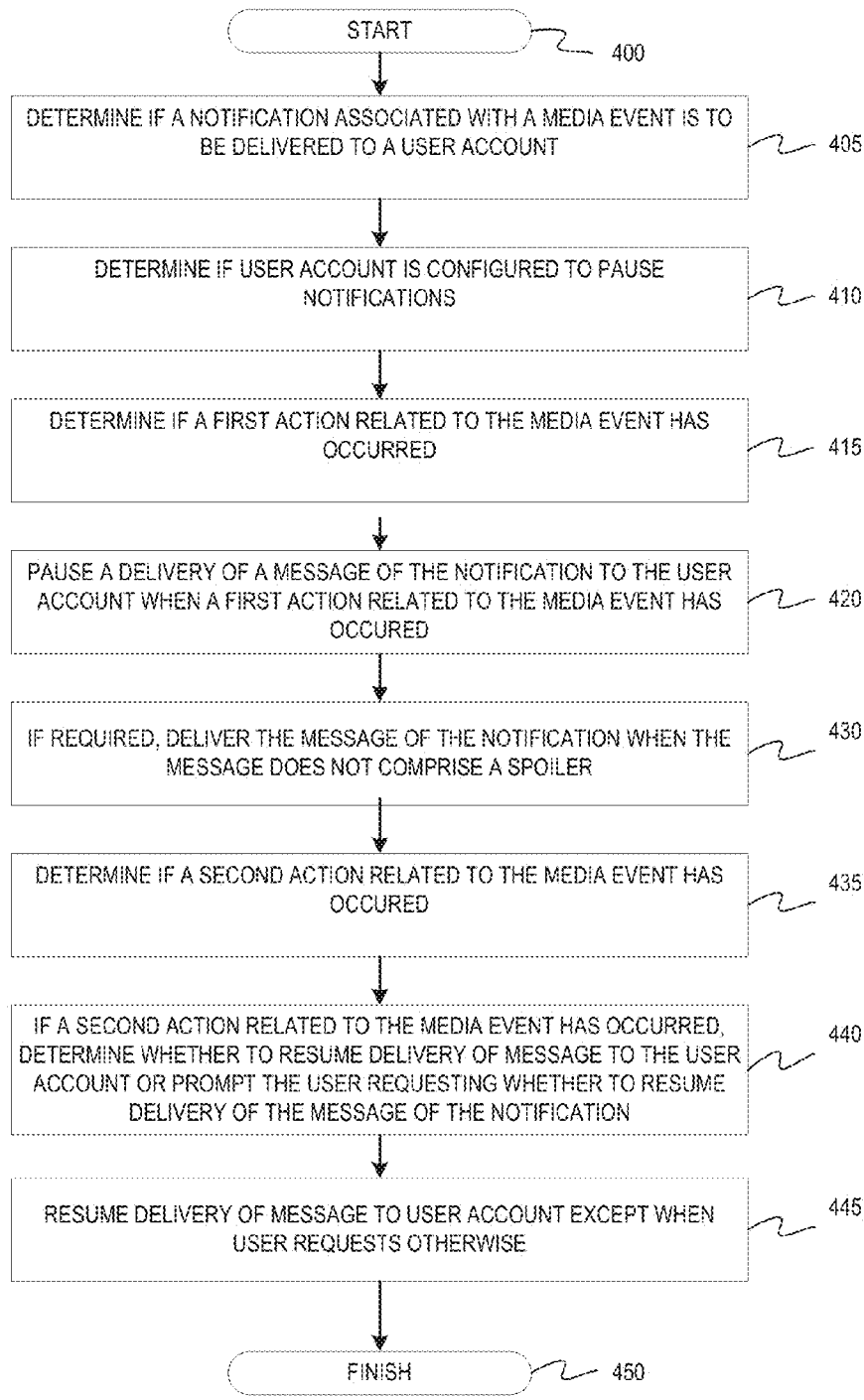
FIG. 4 is a flow diagram illustrating a method of pausing message delivery in push notifications, according to one embodiment.

FIG. 4 is a flow diagram illustrating a method of pausing message delivery in push notifications, according to one embodiment. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 5:
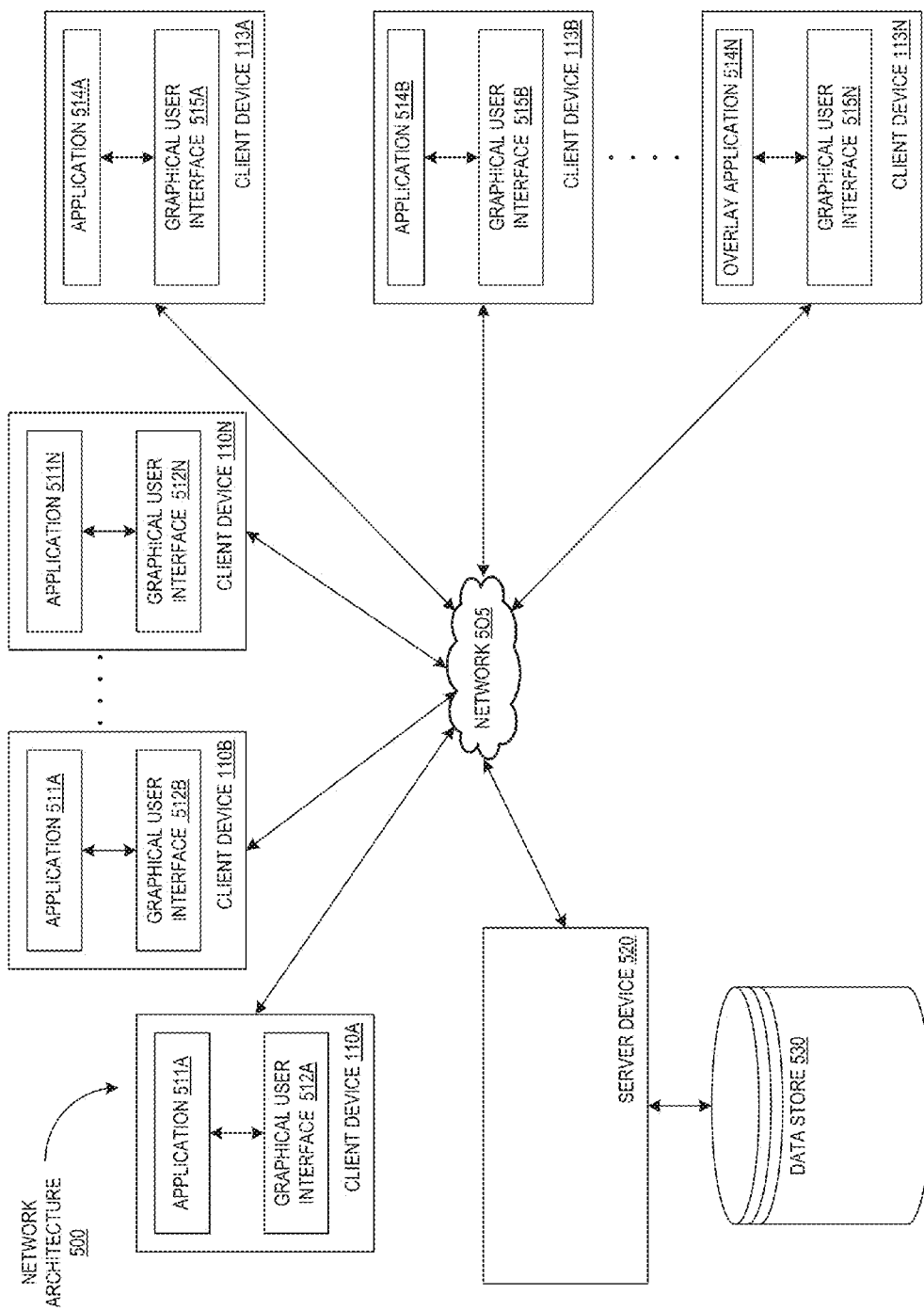
FIG. 5 is a block diagram illustrating a first example network architecture in which embodiments of the disclosure may operate.
Figure 6:
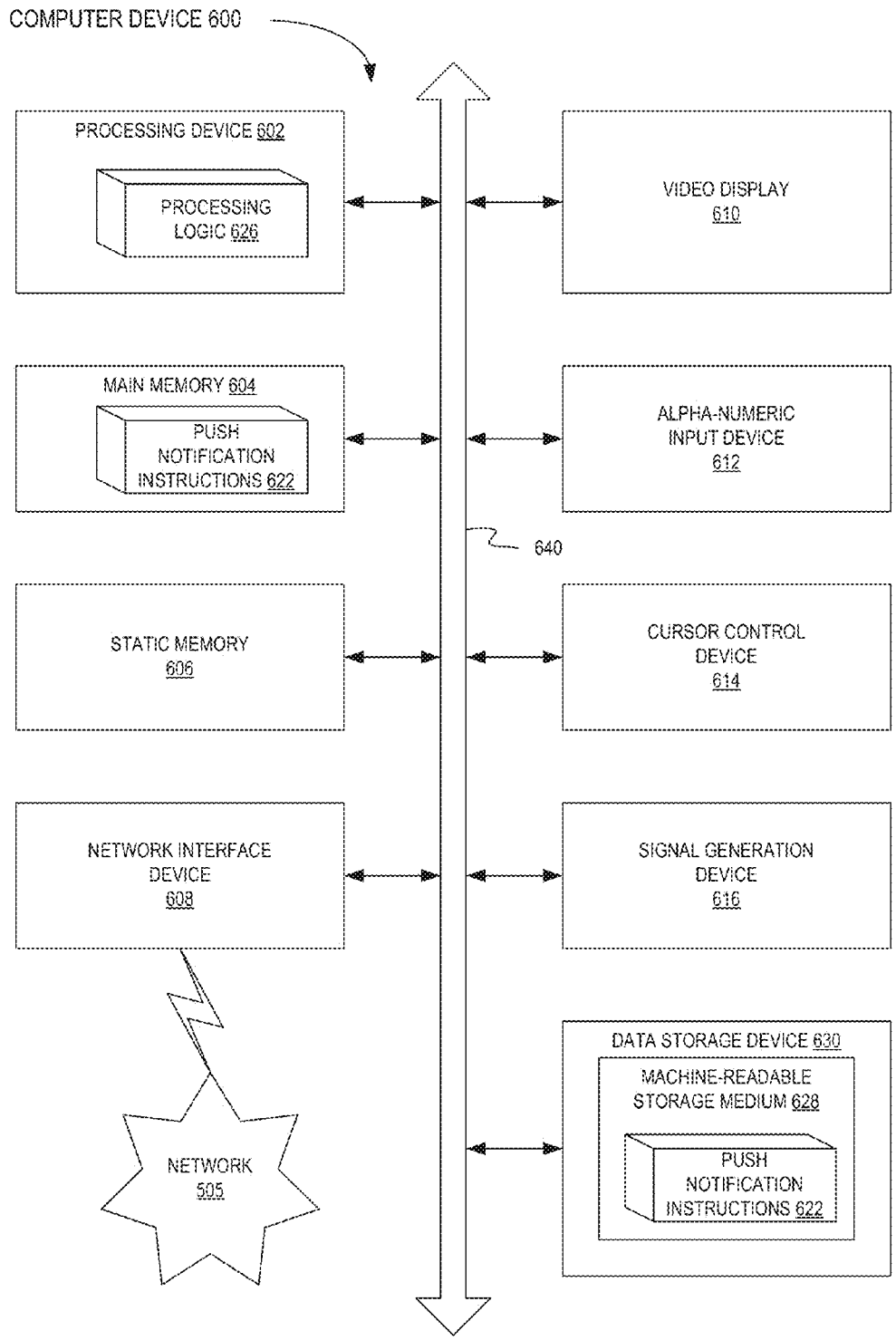
FIG. 6 is a block diagram illustrating a example form of a computing device, in accordance with one embodiment.

In the embodiment illustrated in FIG. 4, the method 400 may be performed by processing logic that comprises hardware (e.g., circuitry, dedicated logic, programmable logic, microcode, etc.), software (e.g., instructions run on a processor), or a combination thereof. In one embodiment, method 400 may be performed by a server device, as illustrated in FIGS. 5 and 6.

In the embodiment illustrated in FIG. 4, method 400 begins at block 405 where the method determines if a notification associated with a media event is to be delivered to a user account. In one embodiment, a user may sign up to receive various notifications. For example, a user may want to receive notifications regarding a sporting event, political event, artistic event, etc. In another embodiment, a server application 521 on a server device 520 may independently determine whether to send a notification to a user account. Additional embodiments have been discussed above and apply here.

At block 410, the method 400 determines if a user account is configured to pause a notification. In one embodiment illustrated in FIG. 2, a user may configure a user account so that notifications related to a media event are paused. If a user account has not been configured to pause notifications, the method 400 can skip to block 445 and deliver the notification to the user account. However, if a user account is configured to pause notifications, method 400 continues to block 415.

At block 415, the method 400 determines if a first action related to the media event has occurred. As discussed previously, a first action may be user or system defined. For example, a first action may be the start of a sporting event or the time of day. If a first action related to the media event has not occurred, method 400 can skip to block 445 and continue the delivery of the notification. If a first action related to the media event has occurred, method 400 proceeds to block 420.

At block 420, the method 400 pauses a delivery of a message of the notification to the user account when a first action related to the media event has occurred. As explained above, a pause in the delivery of a message of the notification can prevent a user from receiving spoiler information. After block 420, the method 400 proceeds to block 430.

In one embodiment, method 400 delivers a transmitting identity for the notification to the user account while pausing the delivery of the message. A user's account may or may not be configured to receive a transmitting identity for the notification. In one embodiment, the contents of the message may be paused while additional information such as sender and time is sent to the user. In another embodiment, no information will be sent to the user account unless a second action related to the media event has occurred and a pause in notification ended. It should be noted that the additional information sent to the user account is not limited to the sender or time stamp. For example, additional information could be simply a notification sent to the user's account informing the user a message is waiting.

At block 430, the method 400 delivers, if required, the message of the notification when the message does not comprise a spoiler. In one embodiment, if the message of the notification does not contain spoiler information, the message may be delivered to a user's account while other messages that do contain spoiler information are paused. For example in the embodiment illustrated in FIG. 1, message 122, "Let's go out tonight!" is delivered to the recipient devices even though messages from message thread 126 have been paused. In one embodiment, all messages, regardless if they contain spoiler information or not, can be paused. If it is determined that the message does not contain spoiler information and is to be delivered to the user's account, then the method 400 proceeds to block 445. If the message does contain spoiler information, the method 400 proceeds to block 435. It should be noted that if the user's account is not configured to allow messages not containing a spoiler, block 420 proceeds immediately to block 435.

In block 435, the method 400 determines if a second action related to the media event has occurred. In one embodiment, a second action related to the media event may be user defined. For example, a second action may be the end of a sporting event or a specified time. In another embodiment, a second action related to the media event can be a user action. For example, the user may open a paused message, post a message on a message thread, or finish watching the media event. If a second action related to the media event has not occurred, the method 400 proceeds to block 450 and finishes. If a second action related to the media event has occurred, the method 400 proceeds to block 440.

In block 440, the method 400 determines if a second action related to the media event has occurred, whether to resume delivery of the message to the user's account or prompt the user requesting whether to resume delivery of the message of the notification. In one embodiment, a user may be prompted whether to continue the notification pause after a second action has occurred. For example, a user may open a paused message wherein the system responds by prompting the user whether to resume delivery of the message and/or end the pause of message notification. In another embodiment, the occurrence of a second action will automatically resume the delivery of the message of the notification and/or resume the delivery of previously paused notifications. Once the determination is made, the method 400 proceeds to block 445.

In block 445, the method 400 resumes the delivery of the message to the user's account except when the user requests otherwise. If the method 400 resumes the delivery of the message, the message is sent to the user's account, the pause of notifications is ended, and messages previously paused are delivered. In one embodiment, a user may request to continue the pause of notifications, in which case, the method 400 proceeds to block 450 and is finished. In another embodiment, a user may request the receipt of a single paused message but wish to resume the pause of notification. After block 445, the method 400 proceeds to block 450 and is finished.

FIG. 5 is a block diagram illustrating a first example network architecture in which embodiments of the disclosure may operate. The network architecture 500 includes client devices 110A through 110N, client devices 113A through 113N, and a server device 520, that are communicatively coupled to a network 505. The network architecture 500 also includes a data store 530 that is communicatively coupled to the server device 520. Client devices 110A through 110N, client devices 113A through 113N, and server device 520 may be computing devices such as a desktop computer, a laptop computer, a mainframe computer, a server computer, a personal digital assistant (PDA), a smart phone, a notebook computer, a tablet computer, a gaming console, etc. Network 505 may be one or more of a public network (e.g., the Internet), a private network (e.g., a local area network (LAN) or a wide area network (WAN)), a wired network (e.g., Ethernet network), a wireless network (e.g., an 802.11 network), a cellular network (e.g., a Long Term Evolution (LTE) network), a broadcast network, or a combination thereof. The data store 530 may be a memory (e.g., random access memory), a cache, a drive (e.g., a hard drive), a flash drive, a database system, or another type of component or device capable of storing data. The data store 530 may also include multiple storage components (e.g., multiple drives or multiple databases) that may also span multiple computing devices (e.g., multiple server computers).

The client devices 110A through 110N and client devices 113A through 113N include applications, 511A through 511N and 514A through 514N, respectively. The application may provide a user with a portal or gateway (e.g., a single point of access) to consume or access media items, such as sporting events or to interact with other users in relation to the media items using applications. The applications may be sports related, video games, email, etc. The applications may provide for push notifications that forward information about the sporting event from a server device 520 supporting the applications. The application may provide or transmit information to the server device 520. Likewise, the server device 520 may provide and transmit information to the client devices through the application.

FIG. 6 illustrates a diagrammatic representation of an example form of a computer device within which a set of instructions, for causing the computer to perform any one or more of the methodologies discussed herein, may be executed. It should be noted that a computer device may be, for example, server device 520, client devices 110A through 110N, and client devices 113A through 113N.

In the embodiment illustrated in FIG. 6, computer device 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 630, which communicate with each other via a bus 640.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 (e.g., pausing notifications or associating devices to user accounts) for performing the operations and steps discussed herein.

In one embodiment, processing device 602 determines that a notification to be delivered to a user account is associated with an event and pausing, by processing device 602, without intervention by the user of the user account, a delivery of a notification message to the user account until an action related to the event has occurred. For example, in the embodiment illustrated in FIG. 1, notification 130, 131, and 132 have been sent from client device 110A. Processing device 602, located in client device 110A or server device 520, determines whether the notifications 130, 131, and 132 are to be delivered to a user account. If the processing device 602 determines that notifications 130, 131, and 132 are to be delivered to a user account, the processing device 602 determines whether to pause the delivery of the notification messages associated with notifications 130, 131, and 132. For example, in the illustrative embodiment in FIG. 1, messages of notifications of 130, 131, and 132 have not been delivered to client devices 113A, 110C, and 110B, respectively. For example, in client device 110C the notification message has been replaced with 159, "Message Paused." The processing device 602 may be located within the application server or within the user's computing device or the operation performed by the processing device may be distributed among the devices The computer device 600 may represent either the application server or a user computing device running an application, for example applications 120, 140, 150, and 151, within which a set of instructions, for causing the computer, or machine, to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer device 600 may further include a network interface device 608 which may communicate with a network 505. The computer device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 630 may include a computer-readable medium 628 on which is stored one or more sets of instructions (e.g., push notification instructions 622, such as pausing a notification) embodying any one or more of the methodologies or functions described herein. The machine-readable storage medium 628 may also be used to store instructions to perform a method of pausing the delivery of push notifications, as described herein. The module 622 may (e.g., pause notification instructions) also reside, completely or at least partially, within the main memory 604 and/or within the processing device 602 during execution thereof by the computer device 600, the main memory 604 and the processing device 602 also constituting computer-readable media. The instructions may further be transmitted or received over a network 505 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "analyzing," "pausing," "receiving," "identifying," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a server over a network, a first action input from a user identifying a first action to occur related to a media event;
    receiving, by the server over the network, a pause message input from the user indicating that delivery of a message of a notification should be paused to one of a plurality of user devices and one of a plurality of user accounts;
    receiving, by the server over the network, a first device input from the user identifying a first user device of the plurality of user devices to which to pause delivery of the message;
    receiving, by the server over the network, a second device input from the user identifying a second client device of the plurality of user devices to which to receive the message;
    receiving, by the server over the network, a first account input from the user identifying a first user account of the plurality of user accounts to which to pause delivery of the message;
    receiving, by the server over the network, a second account input from the user identifying a second user account of the plurality of user accounts to which to receive the message;
    receiving, by the server over the network, the notification associated with the media event;
    determining, by a processing device of the server, that the notification associated with the media event is to be delivered over the network to the first user account and the first user device;
    receiving, by the processing device of the server over the network, indication that the first action related to the media event has occurred;
    pausing, by the processing device without intervention by the user, a delivery of the message of the notification to the first user account and the first user device when the first action related to the media event has occurred;
    delivering, by the processing device of the server over the network, the notification without the message to the first user account and the first user device;
    delivering, by the processing device of the server over the network, a transmitting identity for the notification to the first user account and the first user device; and
    delivering, by the processing device of the server over the network, the notification with the message to the second user account and the second user device.

2. The method of claim 1, wherein the media event is a sporting event.

3. The method of claim 1, wherein the first action related to the media event is a start of the media event.

4. The method of claim 1, further comprising:
    resuming delivery of the message to the first user account, in response to an occurrence of a second action related to the media event.

5. The method of claim 4, wherein the occurrence of the second action related to the media event comprises detecting an action by the user on a transmitting identity for the notification.

6. The method of claim 1, further comprising:
    sending a prompt to the first user account requesting whether to resume delivery of the message of the notification, in response to an occurrence of a second action related to the media event.

7. The method of claim 1, wherein the message comprises a voice chat.

8. The method of claim 1, further comprising:
    delivering the message of the notification when the message does not comprise a spoiler.

9. A server comprising:
    a memory;
    a processing device of the server, operatively coupled to the memory, the processing device to:
        receive, over a network, a first action input from a user identifying a first action to occur related to a media event;
        receive, over the network, a pause message input from the user indicating that delivery of a message of a notification should be paused to one of a plurality of user devices and one of a plurality of user accounts;
        receive, over the network, a first device input from the user identifying a first user device of the plurality of user devices to which to pause delivery of the message;

receive, over the network, a second device input from the user identifying a second client device of the plurality of user devices to which to receive the message;
receive, over the network, a first account input from the user identifying a first user account of the plurality of user accounts to which to pause delivery of the message;
receive, over the network, a second account input from the user identifying a second user account of the plurality of user accounts to which to receive the message;
receive, over the network, the notification associated with the media event;
determine that the notification associated with the media event is to be delivered over the network the first user account and the first user device;
receive, over the network, indication that the first action related to the media event has occurred;
pause, without intervention by the user, a delivery of the message of the notification to the first user account and the first user device when the first action related to the media event has occurred;
deliver, over the network, the notification without the message to the first user account and the first user device;
deliver, over the network, a transmitting identity for the notification to the first user account and the first user device; and
deliver, over the network, the notification with the message to the second user account and the second user device.

10. A non-transitory computer readable storage medium having instructions, which when executed by a processing device of a server, cause the processing device to:
receive, by the processing device of the server over a network, a first action input from a user identifying a first action to occur related to a media event;
receive, by the processing device of the server over the network, a pause message input from the user indicating that delivery of a message of a notification should be paused to one of a plurality of user devices and one of a plurality of user accounts;
receive, by the processing device of the server over the network, a first device input from the user identifying a first user device of the plurality of user devices to which to pause delivery of the message;
receive, by the processing device of the server over the network, a second device input from the user identifying a second client device of the plurality of user devices to which to receive the message;
receive, by the processing device of the server over the network, a first account input from the user identifying a first user account of the plurality of user accounts to which to pause delivery of the message;
receive, by the processing device of the server over the network, a second account input from the user identifying a second user account of the plurality of user accounts to which to receive the message;
receive, by the processing device of the server over the network, a notification associated with the media event;
determine, by the processing device of the server, that the notification associated with the media event is to be delivered over the network to the first user account and the first user device;
receive, by the processing device of the server over the network, indication that the first action related to the media event has occurred;
pause, by the processing device without intervention by the user, a delivery of the message of the notification to the first user account and the first user device when the first action related to the media event has occurred;
deliver, by the processing device of the server over the network, the notification without the message to the first user account and the first user device;
deliver, by the processing device of the server over the network, a transmitting identity for the notification to the first user account and the first user device; and
deliver, by the processing device of the server over the network, the notification with the message to the second user account and the second user device.

11. The non-transitory computer readable storage medium of claim 10, wherein the first action related to the media event is a start of the media event.

12. The non-transitory computer readable storage medium of claim 10, wherein the message comprises a voice chat.

13. The non-transitory computer readable storage medium of claim 10, wherein the processing device is further to:
deliver the message of the notification when the message does not comprise a spoiler.

* * * * *